(12) United States Patent
Anderson

(10) Patent No.: US 7,411,606 B2
(45) Date of Patent: *Aug. 12, 2008

(54) EFFICIENT IMAGE CATEGORIZATION

(75) Inventor: Eric C. Anderson, San Jose, CA (US)

(73) Assignee: FotoMedia Technologies, LLC, Portsmouth, NH (US)

( * ) Notice: Subject to any disclaimer, the term of this patent is extended or adjusted under 35 U.S.C. 154(b) by 443 days.

This patent is subject to a terminal disclaimer.

(21) Appl. No.: 11/061,176

(22) Filed: Feb. 18, 2005

(65) Prior Publication Data

US 2005/0140791 A1    Jun. 30, 2005

Related U.S. Application Data

(63) Continuation of application No. 09/502,378, filed on Feb. 11, 2000, now Pat. No. 6,862,038.

(51) Int. Cl.
*H04N 5/225* (2006.01)
*H04N 5/76* (2006.01)
*H04N 5/222* (2006.01)

(52) U.S. Cl. ............ 348/207.1; 348/231.2; 348/333.02; 715/780; 345/160

(58) Field of Classification Search ............... 348/207.1, 348/231.2, 333.02, 231.3; 345/160; 715/700, 715/780

See application file for complete search history.

(56) References Cited

U.S. PATENT DOCUMENTS

| | | | |
|---|---|---|---|
| 5,796,428 A | 8/1998 | Matsumoto et al. | |
| 5,845,166 A | 12/1998 | Fellegara et al. | |
| 5,940,121 A | 8/1999 | Mcintyre et al. | |
| 6,005,679 A * | 12/1999 | Haneda | 707/E17.026 |
| 6,097,389 A * | 8/2000 | Morris et al. | 715/804 |
| 6,237,010 B1 * | 5/2001 | Hui et al. | 715/502 |
| 6,335,742 B1 * | 1/2002 | Takemoto | 715/781 |
| 6,462,778 B1 | 10/2002 | Abram et al. | |
| 6,603,489 B1 * | 8/2003 | Edlund et al. | 715/780 |
| 6,650,826 B1 * | 11/2003 | Hatta | 386/52 |
| 7,032,182 B2 * | 4/2006 | Prabhu et al. | 715/780 |

FOREIGN PATENT DOCUMENTS

JP    11-184605    *    7/1999

OTHER PUBLICATIONS

ACD Systems website printout.

* cited by examiner

*Primary Examiner*—Nhan T Tran

(57) ABSTRACT

A method for efficiently categorizing images on a computer system is disclosed. A series of related images that are to be categorized are ordered by time of capture, and category levels for input of category information by a user are displayed. The category levels include a highest-category level and a lowest-category level, where the highest-category level has a low frequency of data change between the series of related images, and the lowest-category level has a high frequency of data change between the series of images. A first image is then categorized by allowing the user to enter highest-category level data and lowest-category level data. A next image in the series is then categorized by leaving the highest-category level data unchanged, and automatically selecting the lowest-category level data for reentry by the user, thereby eliminating the need for the user to reenter the highest-category level data.

20 Claims, 5 Drawing Sheets

EFFICIENT IMAGE CATEGORIZATION

The present invention is a continuation of U.S. application Ser. No. 09/502,378, filed on Feb. 11, 2000, now U.S. Pat. No. 6,862,038, and entitled "Efficient Image Categorization."

FIELD OF THE INVENTION

The present invention relates to categorizing digital images on a computer system, and more particularly, to a more efficient method for categorizing images and for reducing inconsistent terminology during categorization and searching.

BACKGROUND OF THE INVENTION

As digital photography and the digitization of old photographs become more and more prevalent, the number of digital images that are stored and archived will increase dramatically. Whether the digital images are stored locally on a user's PC or uploaded and stored on a Web photo-hosting site, the number of images will make it increasingly difficult for a user to find desired images.

To alleviate this problem, PC applications are available today that allow a user to categorize images. PhotoSee Pro™, by ACD Systems, for example, is an image management program that includes photo viewing functionality and a photo database for storing and retrieving thumbnail images from a photo CD. The program allows a user to browse their entire photo collection without swapping photo CDs. The program creates a thumbnail image for each photo found on the CD and allows the user to enter properties, such as caption, date, photographer, description, and keywords, for each thumbnail image. The user may then search the entire photo collection by entering desired properties.

Although programs such as PhotoSee Pro, and image database programs in general, allow the categorization of images using multiple categories, these programs have a major drawback. The problem is that in order to categorize the images, the user must retype the category information for each image. When categorizing a photo CD having a large amount of images, manually entering category information for each image is extremely tedious and time-consuming for the user. The problem is even worse for users who have a large collection of photo CDs or scanned images that they wish to electronically archive.

What is needed is a more efficient method for categorizing digital images. The present invention addresses such a need.

SUMMARY OF THE INVENTION

The present invention provides a method for efficiently categorizing images on a computer system is disclosed. A series of related images that are to be categorized are ordered by time of capture, and category levels for input of category information by a user are displayed. The category levels include a highest-category level and a lowest-category level, where the highest-category level has a low frequency of data change between the series of related images, and the lowest-category level has a high frequency of data change between the series of images. A first image is then categorized by allowing the user to enter highest-category level data and lowest-category level data. A next image in the series is then categorized by leaving the highest-category level data unchanged, and automatically selecting the lowest-category level data for reentry by the user, thereby eliminating the need for the user to reenter the highest-category level data.

A second aspect of the present invention provides a list key category terms available to categorize images. To categorize a current image, the user selects particular terms from the list, and those terms are copied to a list of terms that will be used to categorize the current image. When the next image is to be categorized, that image will inherit the terms used for the previous images.

Thus, the present invention dramatically reduces the effort required to categorize a new or existing set of images that are related by subject matter. In addition, the use of category lists greatly reduces errors in cataloging and searching because the lists ensure that the user uses consistent terminology when entering category information.

DESCRIPTION OF THE INVENTION

The present invention relates to efficiently categorizing images on a computer system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention takes advantage of the fact that images are taken as people move through life in a sequence of time, and the pictures are taken along that time line. Thus, there is typically a high degree of correlation between images that are captured during a typical photography session. For example, a person who takes the camera to a birthday party may take multiple photographs of the party. Therefore, all the images taken during that photography session will be related by both time and subject matter. While on vacation, pictures are usually taken in multiple sessions. For example, while on vacation in Greece, a tourist will take groups of pictures during different photography sessions (e.g., a series of images taken at a hotel, another series of images taken at a museum, another series of images taken at a beach, and so on). All the images taken while on vacation are related by the fact that they were taken in Greece, while all the photographs taken at the museum are related by the fact that they were taken at the museum in Greece, and so on.

The problem is that since all the photographs are related, information required to categorize the photographs in a database must also be replicated, which is time-consuming and tedious to the user.

The present invention provides automatic sequential categorization that takes advantage of the fact that photographs are related by time and subject matter, with the general principal being that the closer in time the images were taken, the higher the degree of subject matter correlation. Specifically, the assumption is made that when storing a set of images in a database, if the images are first ordered by date and time of capture and by source (camera and/or photographer), then the replication of data between images in the sequence may be automated. Thus, when categorizing a series of related digital images, the category information from one image is automatically inherited by the next image to reduce the amount of input required during the categorization process. Referring to the birthday party example, with the present invention, the information that each of the birthday photographs is classified as "friends," "birthday," "indoors," does not have to be reentered for each image in the series, thereby saving the user time and effort.

Figure 1:
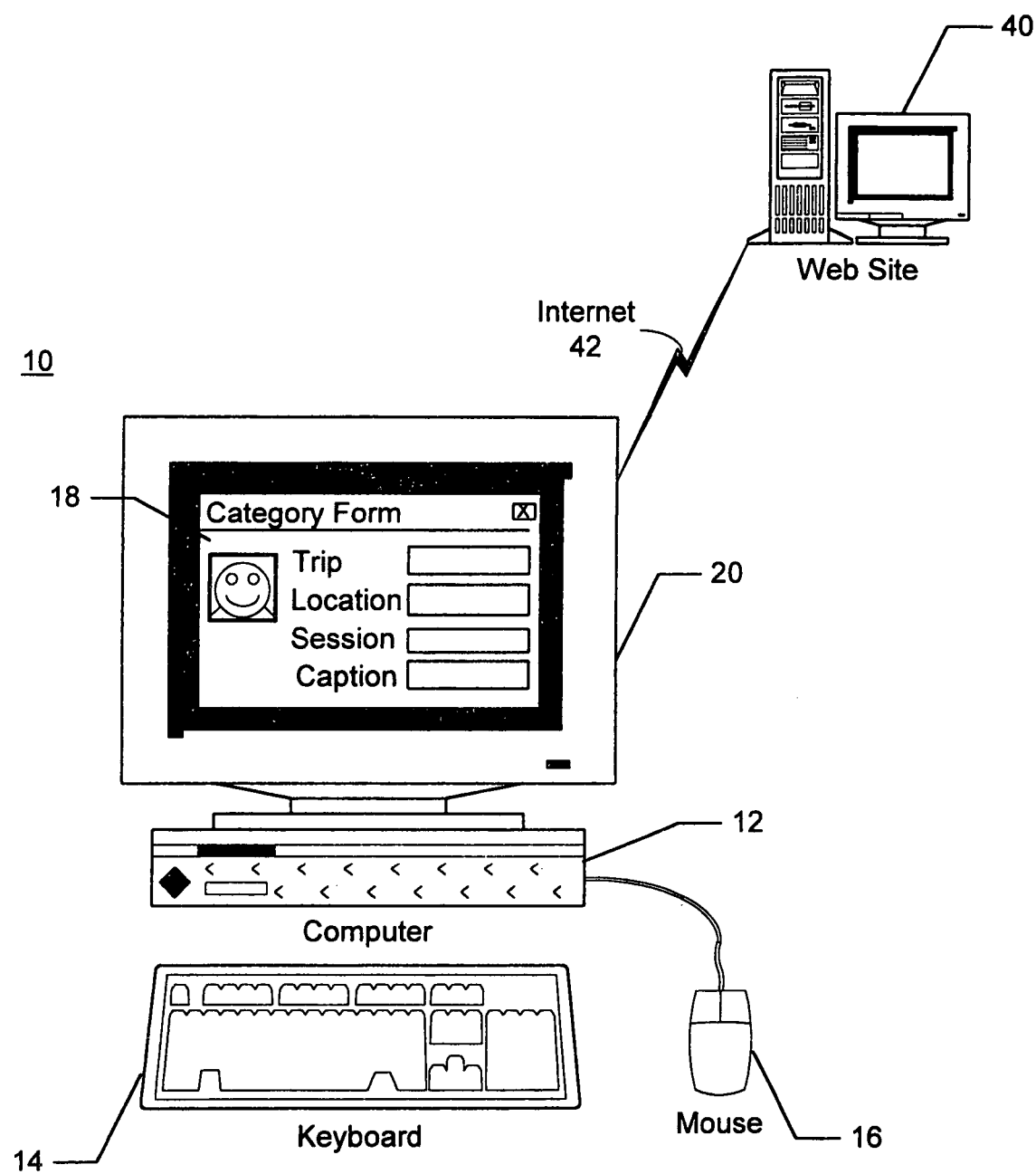
FIG. 1 is a block diagram illustrating an image categorization system.

FIG. 1 is a block diagram illustrating an image categorization system in a preferred embodiment of the present invention. The system 10 includes a workstation or personal computer (PC) 12, which is controlled by a keyboard 14 and a pointing device, such as a mouse 16, and includes a display 20. Digital images to be categorized and stored may be input into the system from a variety of sources, such as a digital camera, a CD or DVD ROM, a disk, or a scanner, for instance.

A user then categorizes the images using an image management application 18 written in accordance with the present invention, which stores the images along with category information for later retrieval. The images and category information may be stored locally on a PC storage device, such as a hard drive, CDR or writeable DVD, or high-capacity disk. The images and category information may also be uploaded for storage on a Web-hosting photo site 40 via the Internet 42. It should also be readily understood that the computer 12 and peripheral devices could be a dedicated box that displays the image management application 18 and the images on a display such as television, for instance.

Figure 2:
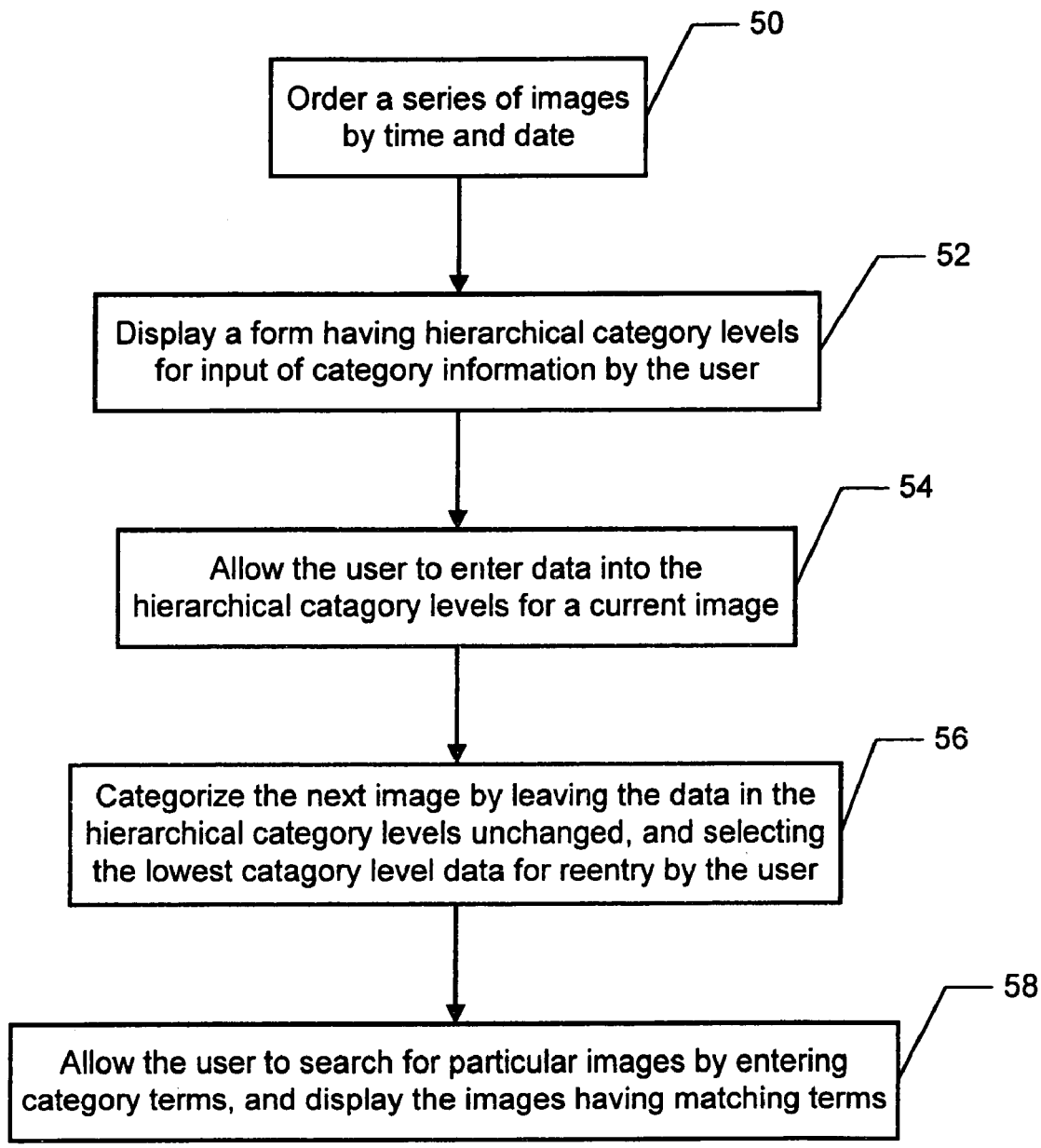
FIG. 2 is a flow chart illustrating the process of categorizing images.

FIG. 2 is a flow chart illustrating the process of categorizing images using an image management application 18 in accordance with the preferred embodiment of the present invention. As stated above, in one preferred embodiment, the process is implemented as an image management application 18 executed on a computer. In a second preferred embodiment, the process is implemented as the image management application 18 which is executed by a remote server and displayed on the computer's monitor 20 via a network, such as the Internet 42. In a third preferred embodiment, the process is executed on a digital camera, or other hand-held image device, equipped with voice recognition and/or a stylus for input of the data.

The process for categorizing images begins by ordering a series of images to be categorized by time and date of capture in step 50. A form is then displayed that includes a series of hierarchical category levels for input of category information by the user in step 52.

Figure 3A:
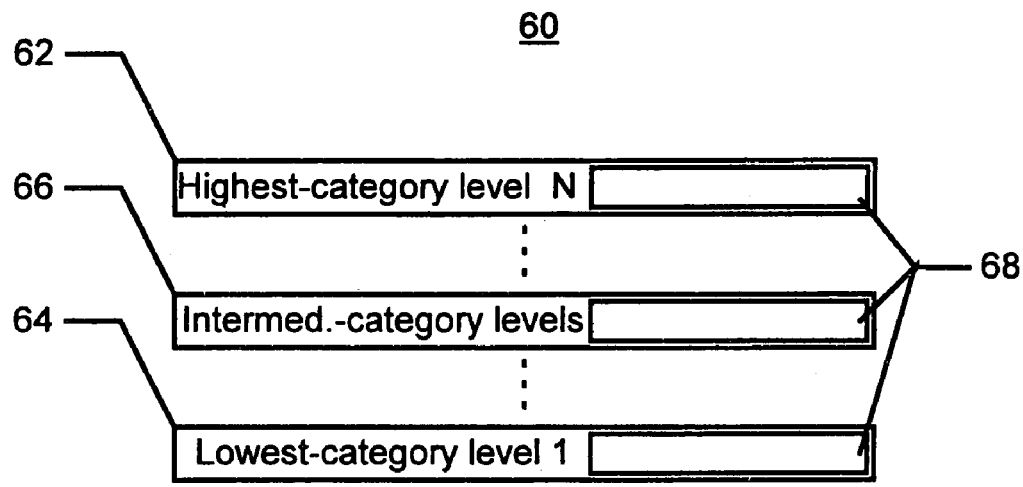
FIG. 3A is a block diagram illustrating a conceptual category form with hierarchical category levels.

FIG. 3A is a block diagram illustrating a conceptual category form with hierarchical category levels. The category levels 60 are displayed on a monitor 20 and preferably arranged from highest-category level 62 to lowest-category level 64, with intermediate category levels 66 in-between. Each category level 60 includes a corresponding field 68 for data entry by the user.

According to the present invention, the hierarchical category levels 60 are used to represent levels of conceptual correlation between adjacent images. That is, the highest-category level 62 is used to represent high-level concepts pertaining to the images, and the lowest-category level 64 are used to represent detail-level concepts pertaining to the images. As a user moves from one image to the next during categorization, the data corresponding to the high-level concepts in the highest-category level 62 will change least frequently, while the data corresponding to low-level concepts in progressively lowest-category level 64 will change with progressively higher frequency. At the lowest-category level, it is assumed that there is virtually no correlation between adjacent images.

Figure 3B:
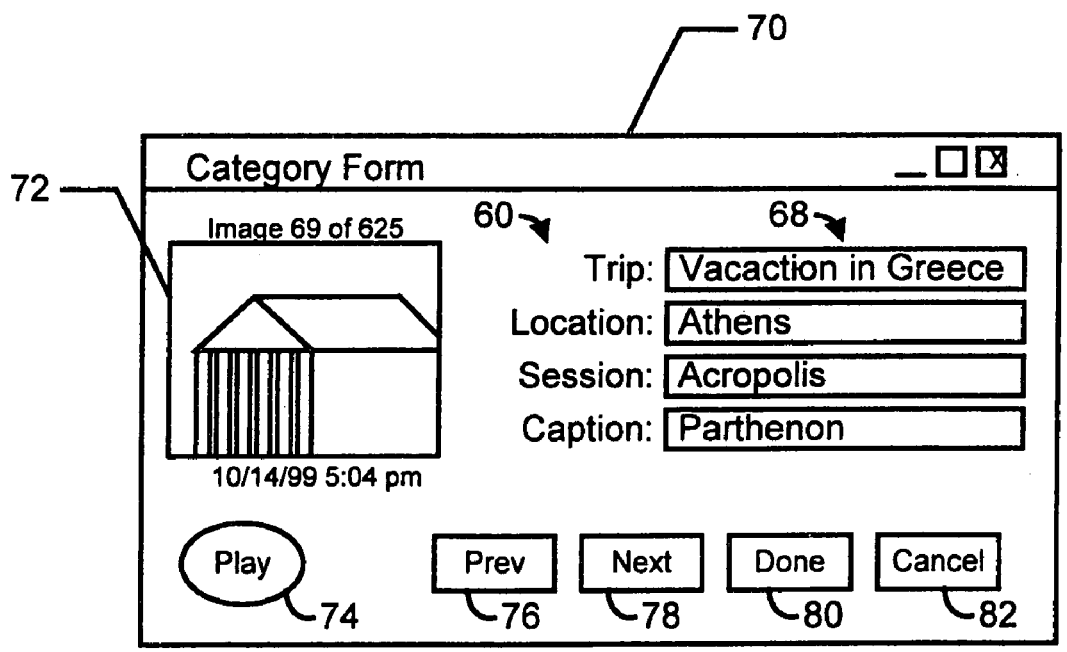
FIG. 3B is a block diagram illustrating a specific example of a category form with hierarchical category levels.

FIG. 3B is a block diagram illustrating an example of a category form having hierarchical category levels. In this example, the category form 70 includes four category levels 60, which may be user definable or set by default. Assume for example that a user visited various cities around the world and wishes to categorize the photographs. It is therefore appropriate that the images be categorized by the broad concept of "Trip" in the highest category-level, the names of the cities in the second highest category-level, called "Location", the names of the locations within each city in the third highest category-level, called "Session", and the details pertaining to each individual image in the lowest category-level, called "Caption".

In a preferred embodiment, the category form 70 includes an area for displaying a thumbnail 72 of the current image. The category form 70 may also include various function buttons, such as a play button 74, a "Previous" button 76, a "Next" button 77, a "Done" button 78, a "Cancel" button 79. The play button 74 plays any sound associated with the image, the "Previous" button 76 returns to the previous image, the "Next" button 77 goes to the next image, the "Done" button 78 saves all changes made and for exits, and the "Cancel" button 79 cancels any changes made to the current image.

Referring again to FIG. 2, after the category form 70 is displayed, the user may enter data into the fields 68 of the hierarchical category levels 60 in order to categorize a current image in step 54. The data may be entered using any input means, such as a keyboard and/or by voice recognition.

Referring to FIG. 3B for example, the user has entered data for a current image belonging to a session of images captured at the Acropolis in Athens, Greece. Accordingly, the data entered for "Trip" is "Vacation in Greece"; the data entered for "Location" is "Athens"; the data entered for "Session" is "Acropolis"; and the data entered for "Caption" is "Parthenon".

Referring to both FIGS. 2 and 3B, after entering the category data, the next step in the processes is to categorize the next image in the series. In a preferred embodiment, this is done when the user clicks the "Next" button 77, which applies the category data to the current image, and causes the thumbnail 72 for the next image to appear. According to the present invention, the data in the category level fields 68 is inherited from the previous image and is left unchanged on the display, and the lowest-category level is automatically selected for reentry by the user in step 56.

Figure 3C:
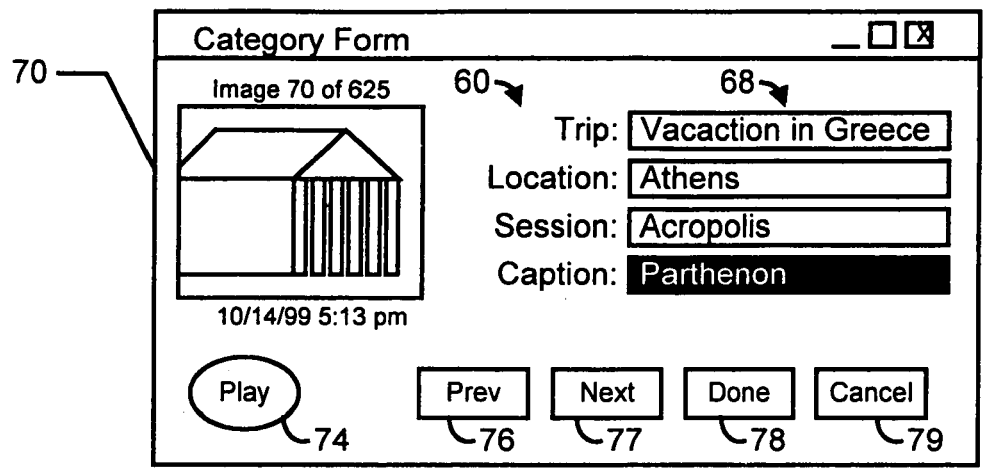
FIG. 3C is a block diagram illustrating the category form.

FIG. 3C is a block diagram illustrating the category form 70 after the user has clicked the "Next" button 77 to categorize the next image in the sequence. All category fields 68 are left unchanged from the example shown in FIG. 3B, except the lowest-category level, "Caption", which is selected for entry. The user may choose to leave the data unchanged (e.g., it is another photo of the Parthenon), or the user may change the data by entering a new "Caption".

If the current image to be categorized was photographed in a different session than the previous image, then the user may change the data in the previous category level, "Session", by pressing a key, such as the up arrow, or by clicking on the "Session" field. Successively pressing a key the key will move the cursor to successively higher category levels. When the user clicks the "Next" button 77, the cursor will move to the lowest-category level field.

In a preferred embodiment, however, the present invention takes advantage of the fact that the images are ordered by date and time, and compares the date and time differences between adjacent images to automatically detect category changes from one image to the next. If a category change is detected, then the cursor is placed at the appropriate category level for the next image for reentry. For example, when the user finishes categorizing a current image and moves to the next, the date and time of the current image is compared with the date and time of the next image and the difference is compared to time thresholds. For example, a difference of one day may be used to indicate that the images were taken in different sessions. Therefore the cursor will automatically be moved one a level when the next image appears. A difference of one week may be used to indicate that the images were taken in different locations, and the cursor may be moved up two levels. A difference of one month may be used to indicate that the images were taken on different trips, so the cursor is moved to the top level.

During normal categorization, most images will be related at the session level. Therefore, most adjacent images in a series will not require any change to the category data except at the lowest-category level. Thus, the present invention saves the user an enormous amount of data entry time. In the example where the user took a trip around the world, assume that the user visited twenty-five cities and took on average of five images in five different locations in each city, for a total of 625 images.

Using a conventional program, such as PhotoSee Pro, the user would have to enter the data into each of the four category level fields for each of the 625 images, for a total of 2500 entries (4×625). With the present invention in contrast, the user only has to make 1 entry at the highest-category level, 5 entries at the second highest category-level, 125 entries at the third highest-category level, and 625 entries at the lowest-category level, for a total of 776 entries.

Thus, the present invention allows the user to categorize 625 images in the present example by entering just ⅓ the amount of data required by conventional programs. When entering caption information for the images in this example, the present invention is 3 times more efficient than prior methods. Notice that if the user does not enter the caption information, the user would make 1875 entries (3×625) using conventional programs, but only 131 entries (1+25+125) with the present invention, which is 14 times more efficient. Therefore, using the conventional program, the user may spend a great deal of time entering information but only categorize 15 pictures out of the 625: whereas with the present invention, the user could categorize 210 pictures in the same amount of time. The amount of overall efficiency gained, however, will depend on the number of images taken per session, the number of category levels, and the amount of correlation between the various levels. The more prolific a photographer is, the greater number images taken per session, and consequently the greater the increase in efficiency.

Referring again to FIG. 2, after categorization a series of images, the user may search for particular images by entering category terms into a search form, and the application will display all images having matching keywords in step 58. In one preferred embodiment, the user enters key category terms into a single text box and the category application searches for matches in all category levels. The category application then returns images ordered by the frequency of hits found, or by the number of hits found in the lowest-category level. In a second preferred embodiment, the user enters key category terms into one or more of the available category level fields, and only the images having matching key category words in the respective category levels are returned.

A problem frequently encountered when searching images, and for database searching in general, is that the user may use different terms when categorizing similar photos. Similarly, the user may use different terms to search for an image than the terms used to categorize the image.

For example, a user may categorize one image "Vacation in Japan", and sometime later categorize a similar photo taken in Japan, "Trip to Japan". When performing a subsequent search to find all "Vacation" images, the search may not find the "Trip to Japan" image due to inconsistent terminology.

A second aspect of the present invention solves the problem of inconsistent terminology by allowing a user to choose predefined terms for entry into higher-level categories from a category list during image categorization. The advantage of category lists is that a predefined method of categorization exists; making it less likely that a similar image will be categorized differently and fail to show up in a subsequent search.

Figure 4:
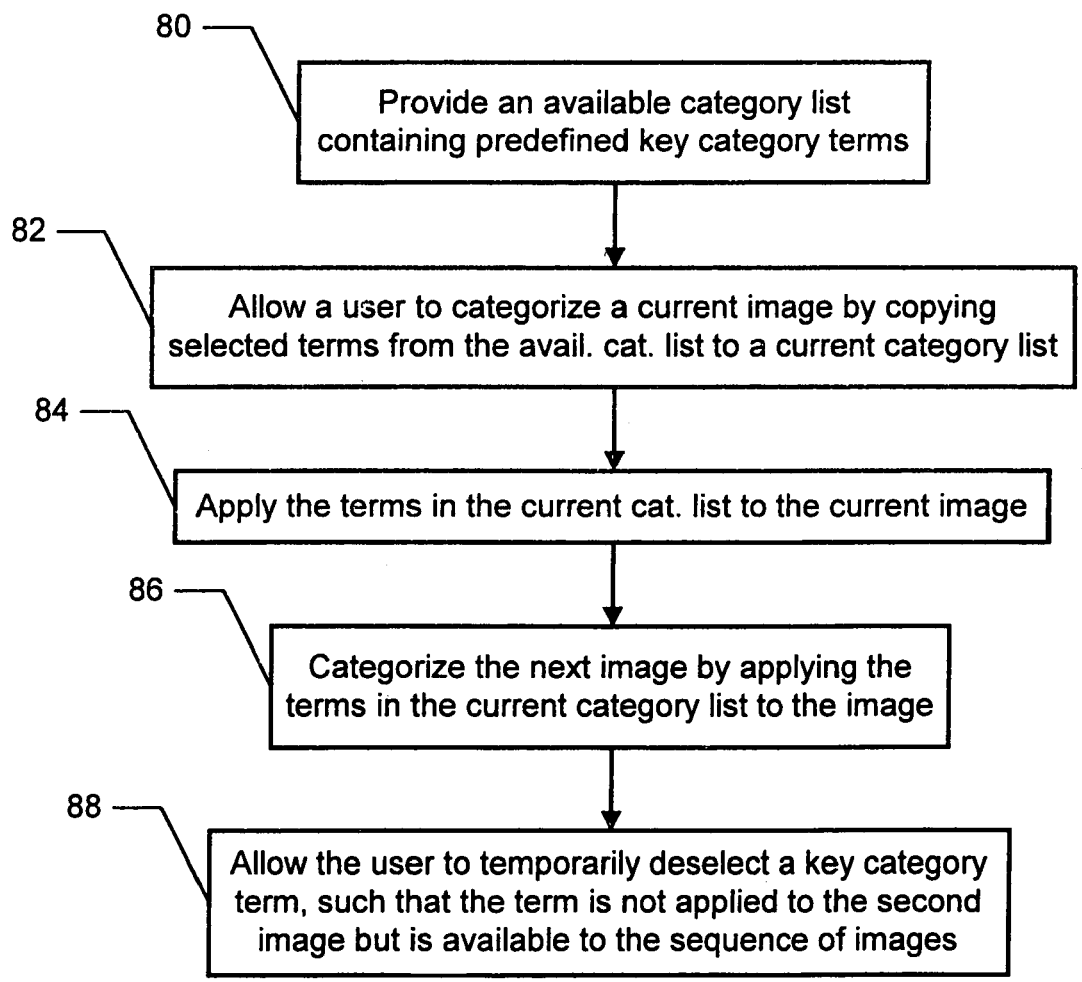
FIG. 4 is a flow chart illustrating a process for minimizing inconsistent terminology.

FIG. 4 is a flow chart illustrating a process for minimizing inconsistent terminology when categorizing a sequence of images in an image management system in accordance with the present invention. The process begins by providing an available categories list containing predefined key category words in step 80. The use may then categorize a current image by moving selected key category terms from the available category lists to a current category list in step 82.

Figure 5:
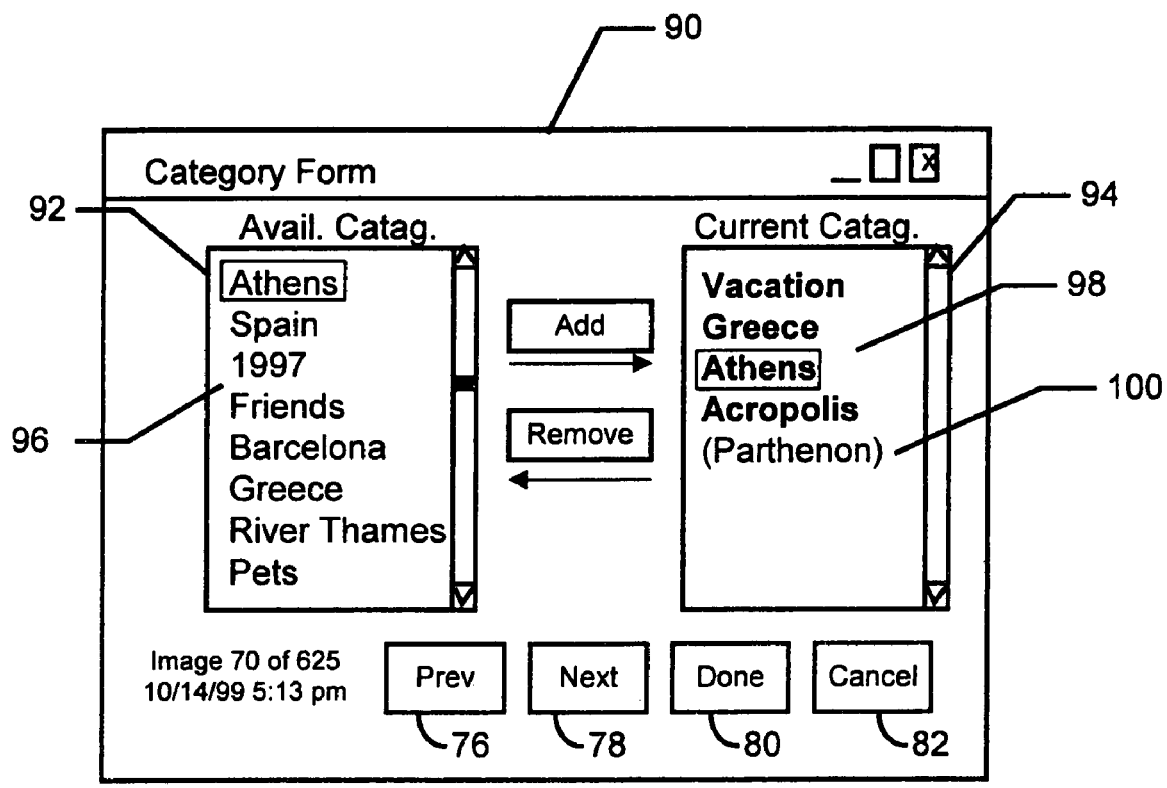
FIG. 5 is a block diagram showing an example category form with category lists in accordance with a second embodiment of the present invention.

FIG. 5 is a block diagram showing an illustrative category form 90 for categorizing a sequence of images using an available categories list and a current categories list, where like components from FIG. 3B have like reference numerals. The available categories list 92 contains a listing of available predefined key category terms 94, which were either entered by the user, or set by default by the system. The current categories list 94 contains a listing of category terms that will be applied to the current image and inherited by the next image. The user populates the current categories list 94 by selecting a key category term 96 from the available categories list 92 and then clicking the "Add" button to copy the term 96 to the current categories list 94. The process is then repeated for each term 96 the user desires to be applied to the current image.

Referring to both FIGS. 4 and 5, after the user has populated the current categories list 94, the user clicks the "Next" button 77 to categorize the next image in the sequence, the key category terms in the current categories list are applied to the current image and saved along with the image in step 84. The next image in the sequence is then categorized by applying the key category terms from the current categories list 94 to the image in step 86.

Before the terms are applied, the user may temporarily deselect key category terms in the current categories list 94, such that the terms are not applied to the current image, but are available to be applied to the sequence of images in step 88. In a preferred embodiment, the key category terms 98 in the current categories list 94 that are to be applied to the current image are displayed in bold font, while the temporarily deselected key category terms 100 are shown in normal font in parentheses. Alternatively, the temporarily deselected key category terms 100 may be moved from the current categories list 94 to a third list (not shown).

According to the present invention, the category lists 92 and 94 take advantage of the fact key category terms will not change that often between adjacent images in a sequence of related images, so only minor switching between the lists 92 and 94 is required by the user.

In a third embodiment, rather than displaying key category terms 96 in the available categories list 92, the category form 70 of FIG. 3B may be provided with an autotype feature. As the user types entries into the data fields 68, the entries are compared with all previous entries into that field and when a match is found; the system automatically enters the previous entry into the field for the user, which reduces inconsistent terminology.

After all the images have been categorized, the user may perform a search for particular images. In a preferred embodiment, a search form is displayed having the available categories list 92 and the current categories list 94. The user enters the search terms using the same procedure used for categorizing images, namely moving key category terms 96 from the available categories list 92 to the current categories list 94. Once the desired terms 96 have been chosen, the user can click a button to execute the search.

An efficient method for categorizing a sequence of images has been disclosed. The combined use of the principles disclosed herein will dramatically reduce the effort to categorize a new or existing set of images that are related by subject matter, which is typically a natural consequence of photography.

The present invention has been described in accordance with the embodiments shown, and one of ordinary skill in the art will readily recognize that there could be variations to the embodiments, and any variations are would be within the spirit and scope of the present invention. Accordingly, many modifications may be made by one of ordinary skill in the art without departing from the spirit and scope of the appended claims.

What is claimed is:

1. A method for efficiently categorizing images on a computer system, comprising:
    ordering a series of related images that are to be categorized by time of capture;
    displaying a user interface with data entry fields corresponding to category levels for input of category information by a user, wherein the category levels include a highest-category level and a lowest-category level, the highest-category level having a low frequency of data change between the series of related images, and the lowest-category level having a high frequency of data change between the series of related images;
    categorizing a first image by allowing the user to enter, via the highest-category level data entry field, highest-category level data and, via the lowest-category level data entry field, lowest-category level data; and
    categorizing a next image in the series by automatically determining based on the image's time of capture whether to initiate user data entry in the highest-category level data entry field or the lowest-category level data entry field.

2. The method of claim 1 wherein categorizing a next image includes comparing date and time differences between the first image and the next image.

3. The method of claim 1 further including:
    in response to a user pressing a key, moving a cursor from the lowest-category level data entry field to a higher-category level data entry field for data entry.

4. The method of claim 1 further including:
    categorizing another image in the series by leaving the cursor at the higher-category level data entry field for data entry.

5. The method of claim 1 wherein displaying category levels further includes the step of:
    displaying an intermediate category level data entry field having medium frequency of data change between the series of related images.

6. The method of claim 1 comprising displaying a thumbnail of the current image being categorized.

7. A method for efficiently categorizing images on a computer system, comprising:
    ordering a series of related images that are to be categorized by time of capture;
    displaying category levels for input of category information by a user, wherein the category levels include a highest-category level and a lowest-category level, the highest-category level having a low frequency of data change between the series of related images, and the lowest-category level having a high frequency of data change between the series of related images;
    categorizing a first image by allowing the user to enter highest-category level data and lowest-category level data;
    categorizing a next image in the series by leaving the highest-category level data unchanged, and automatically selecting the lowest-category level data for reentry by the user, thereby eliminating the need for the user to reenter the highest-category level data; and
    as the user enters data, comparing the data with previous entries, and when a match is found, automatically entering the previous entry to thereby reduce inconsistent terminology.

8. A system for efficiently categorization digital images, comprising:
    input means for receiving a series of digital images;
    a display;
    a computer;
    interface means for a user to operate the computer;
    storage means for storing the digital images; and
    an image management application executed by the computer, wherein the image management application includes means for:
    ordering a series of related images that are to be categorized by time of capture;
    displaying a user interface with data entry fields corresponding to category levels for input of category information by a user, wherein the category levels include a highest-category level and a lowest-category level, the highest-category level having a low frequency of data change between the series of related images, and the lowest-category level having a high frequency of data change between the series of related images;
    categorizing a first image by allowing the user to enter, via the highest-category level data entry field, highest-category level data and, via the lowest-category level data entry field, lowest-category level data; and
    categorizing a next image in the series by automatically determining based on the image's time of capture whether to initiate user data entry in the highest-category level data entry field or the lowest-category level data entry field.

9. The system of claim 8 wherein the image management application compares date and time differences between the first image and the next image.

10. The system of claim 8 wherein the computer comprises a web server that is remote from the display and interface means.

11. The system of claim 8 wherein the display is a television.

12. The system of claim 8 wherein the interface means comprises a keyboard and a mouse.

13. The system of claim 8 wherein the interface means comprises voice recognition.

14. A computer readable medium embodying computer program instructions for efficiently categorizing images on a computer system, the instructions for:
   ordering a series of related images that are to be categorized by time of capture;
   displaying a user interface with data entry fields corresponding to category levels for input of category information by a user, wherein the category levels include a highest-category level and a lowest-category level, the highest-category level having a low frequency of data change between the series of related images, and the lowest-category level having a high frequency of data change between the series of related images;
   categorizing a first image by allowing the user to enter, via the highest-category level data entry field, highest-category level data and, via the lowest-category level data entry field, lowest-category level data; and
   categorizing a next image in the series by automatically determining based on the image's time of capture whether to initiate user data entry in the highest-category level data entry field or the lowest-category level data entry field.

15. The method of claim 14 comprising instructions for: comparing date and time differences between the first image and the next image.

16. The computer readable medium of claim 14 further including the instruction of:
   in response to a user pressing a key, moving a cursor from the lowest-category level data entry field to a higher-category level data entry field for data entry.

17. The computer readable medium of claim 14 comprising instructions for categorizing another image in the series by leaving the cursor at the higher-category level data entry field for data entry.

18. The computer readable medium of claim 14 comprising instructions for displaying an intermediate category level data entry field having medium frequency of data change between the series of related images.

19. The computer readable medium of claim 14 comprising instructions for displaying a thumbnail of the current image being categorized.

20. A computer readable medium embodying computer program instructions for efficiently categorizing images on a computer system, the instructions for:
   ordering a series of related images that are to be categorized by time of capture;
   displaying category levels for input of category information by a user, wherein the category levels include a highest-category level and a lowest-category level, the highest-category level having a low frequency of data change between the series of related images, and the lowest-category level having a high frequency of data change between the series of related images;
   categorizing a first image by allowing the user to enter highest-category level data and lowest-category level data;
   categorizing a next image in the series by leaving the highest-category level data unchanged, and automatically selecting the lowest-category level data for reentry by the user, thereby eliminating the need for the user to reenter the highest-category level data; and
   as the user enters data, comparing the data with previous entries, and when a match is found, automatically entering the previous entry to thereby reduce inconsistent terminology.

* * * * *